No. 873,143. PATENTED DEC. 10, 1907.
R. D. WIRT.
GARDEN REEL.
APPLICATION FILED JUNE 11, 1907.
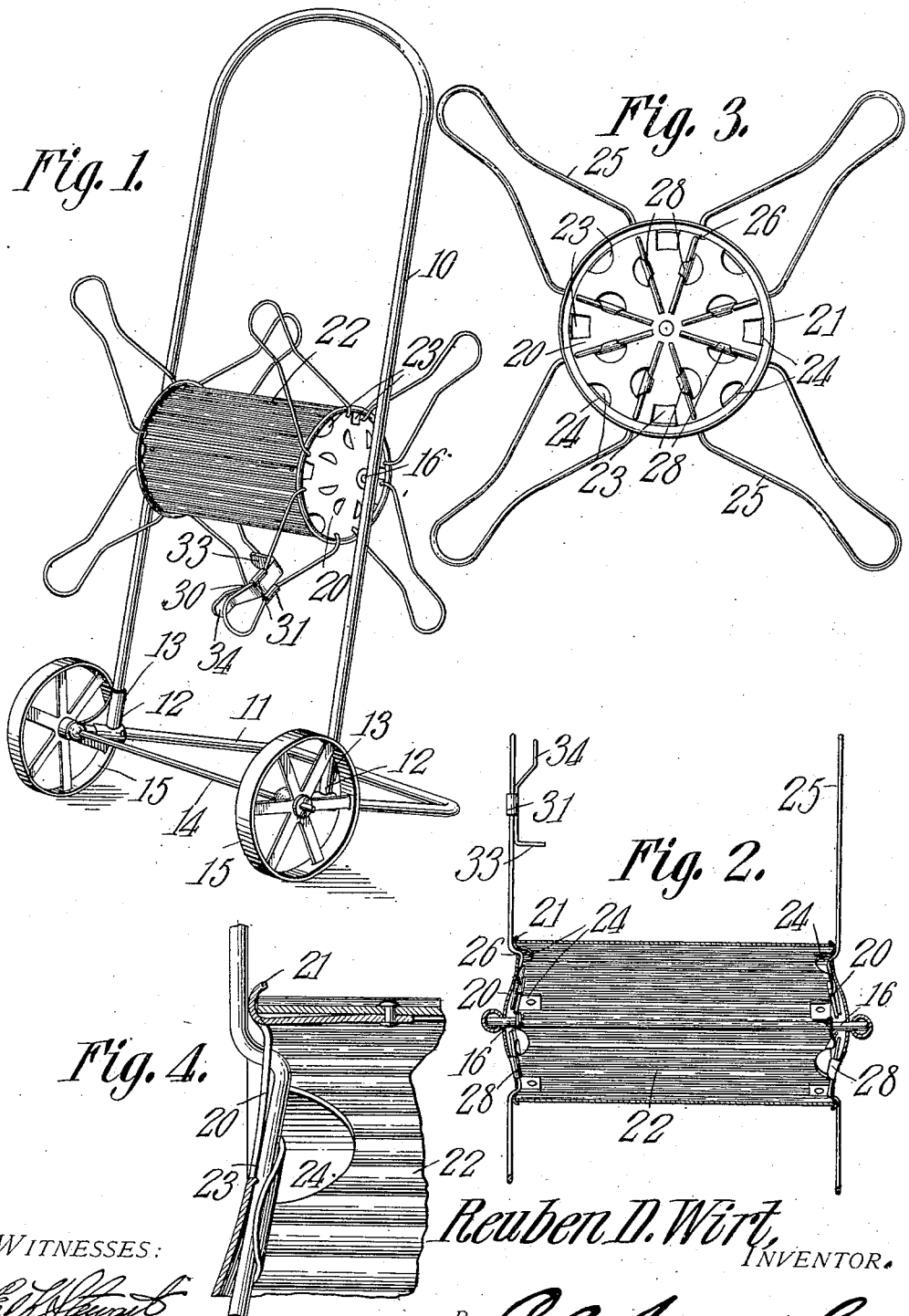

UNITED STATES PATENT OFFICE.

REUBEN D. WIRT, OF PHILADELPHIA, PENNSYLVANIA, ASSIGNOR OF ONE-FOURTH TO EDGAR C. WILSON AND ONE-FOURTH TO RAYMOND KEABLES, BOTH OF PHILADELPHIA, PENNSYLVANIA.

GARDEN-REEL.

No. 873,143.  Specification of Letters Patent.  Patented Dec. 10, 1907.

Application filed June 11, 1907. Serial No. 378,397.

*To all whom it may concern:*

Be it known that I, REUBEN D. WIRT, a citizen of the United States, residing at Philadelphia, in the county of Philadelphia and State of Pennsylvania, have invented a new and useful Garden-Reel, of which the following is a specification.

This invention relates to hose reels, and has for its principal object to provide a hand hose reel of simple and economical construction.

A further object of the invention is to provide a metallic reel structure in which the several parts are firmly secured together in such manner as to mutually reinforce each other, the principal parts of the reel being of such construction that they may be readily formed and assembled by machinery at minimum expense.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

In the accompanying drawings:—Figure 1 is a perspective view of a hose reel constructed in accordance with the invention. Fig. 2 is a transverse sectional view of the reel structure proper. Fig. 3 is an end elevation of the reel with one of the heads detached. Fig. 4 is an enlarged section showing the connection between one of the heads and the drum portion of the reel.

Similar numerals of reference are employed to indicate corresponding parts throughout the several figures of the drawings.

The frame comprises a handle member 10 and a foot section 11, both of which are preferably formed of light piping, such as gas pipe, and the ends of these sections are connected by approximately T-shaped couplings 12 having receiving sockets which are split to receive the ends of the pipe, and the latter are secured in position by rivets 13 that extend through suitable openings formed in the sockets and pipe sections.

The socket members are provided with extended arms having openings forming guides for an axle 14, on the opposite ends of which are mounted wheels 15 which serve as carriers for convenience in moving the reel from place to place. The inner faces of the side arms of the handle are provided with openings for the reception of a reel shaft 16 which is preferably placed in position before the ends of the handle are inserted in the sockets, and on this shaft is mounted the hose carrying drum.

The end disks 20 of the drum are preferably formed of sheet metal, and are dished in order to strengthen the same, the central portions of the disks being bent outward in order that the surfaces which come into contact with the inner side walls of the arms of the handle may be of comparatively small area. The outer edges of the disks are provided with inwardly turned annular flanges 21 within which is arranged a winding drum 22, this drum being formed of a sheet of metal that preferably is provided with corrugations extending longitudinally of the drum for the purpose of reinforcing the same, and the ends of the sheet are brought together and riveted.

Each disk is provided with a number of openings 23 that are formed by cutting out tongues 24 from the body of the disk, and these tongues are bent inward and are riveted to the drum section 22 in order to form a support therefor, while the drum thus acts as a connecting means between the two disks.

The side arms 25 of the reel are formed of wire, each length of wire being centrally bent to form a loop, and the ends of the wire being turned inward and passed through openings 26 formed in the disks, after which the end portions of the wire are bent on lines radial with respect to the center of rotation of the drum and are confined in place by tongues 28 struck up from the metal of the disks, and bent around the ends of the wire. It will be observed that the side arms are reinforced and braced by engagement with the outer faces of the flanges 21, and the outer ends are held from spreading by the engagement of the clamping tongues 28 with the inner ends of the wire.

One of the arms is provided with a hose retaining device 30 formed of a strip of metal having side clips 31 that are bent around and embrace the side arm. The inner end of the strip is turned to form an arm 33 which serves to confine the inner end, or inner portion of the hose to the reel during winding and unwinding, while the outer end of the strip is bent to form an arm 34 which serves as a holder for the outer end of the hose, while the reel is being moved from place to place.

I claim:—

1. In a hose reel, a frame, a shaft carried thereby, a pair of spaced sheet metal disks mounted on the shaft and provided with outwardly dished central portions to present a minimum surface area for direct engagement with the frame, said disks having inwardly extending struck up tongues formed by punching out portions of the disks, and being provided with inwardly bent marginal flanges, and a cylindrical sheet metal drum arranged between the tongues and flanges and secured to said tongues.

2. In a hose reel, a frame, a shaft carried thereby, a pair of sheet metal disks mounted on the shaft and provided with struck up tongues, a drum member carried by the disks, and arms extending from the disks, the inner ends of the arms being secured in place by said tongues.

3. In a hose reel, a frame, a shaft carried thereby, a pair of sheet metal disks mounted on the frame and provided with inwardly extending struck up tongues, a drum connecting the disks, and guard arms extending radially from the disks, the inner ends of the arms being bent to pass through openings near the periphery of the disks, and being secured in place by said tongues.

4. In a hose reel, a frame, a shaft carried thereby, a pair of sheet metal disks mounted on the frame and provided with inwardly extending struck up tongues and with openings, the latter being disposed near the peripheries of the disks, a drum connecting the disks, and a plurality of arms, each formed of a length of wire centrally bent to form a loop, the arms of the loop being bent to pass through the openings near the margin of the disks, and thence bent into approximately radial arrangement with respect to the disks and secured in place by the tongues.

5. In a hose reel, a frame comprising a pair of approximately T-shaped socket members having extended arms provided with openings, an axle extending through the openings, supporting wheels mounted on the axle, a U-shaped foot frame, the arms of which are in alinement with the extended arms of the socket members, and a handle frame secured to the socket members, a shaft supported by the handle member above the socket members, and a hose reel mounted on said shaft.

6. In a hose reel, a sheet metal winding drum, a plurality of arms extending from the drum, and a metallic strip having integral clips bent around and secured to one of said arms, said strip having inwardly bent arms at its inner and outer ends for engagement with the hose.

In testimony that I claim the foregoing as my own, I have hereto affixed my signature in the presence of two witnesses.

REUBEN D. WIRT.

Witnesses:
 ANNA BALAGUER,
 B. L. GILCHRIST.